United States Patent

Lin et al.

[11] Patent Number: 6,151,653
[45] Date of Patent: Nov. 21, 2000

[54] USB/UART CONVERTER AND ITS CONTROL METHOD

[75] Inventors: Chun-Ping Lin, Hsinchu; Chau Kai Hsieh, Hsinchu Hsien, both of Taiwan

[73] Assignee: Winbond Electronics Corp., Hsinchu, Taiwan

[21] Appl. No.: 09/175,150

[22] Filed: Oct. 19, 1998

[30] Foreign Application Priority Data

Feb. 26, 1998 [TW] Taiwan ................................. 87102826

[51] Int. Cl.$^7$ ..................................................... G06F 13/38
[52] U.S. Cl. ............................................ 710/129; 710/131
[58] Field of Search .............................. 710/38, 129, 131

[56] References Cited

U.S. PATENT DOCUMENTS

| | | | |
|---|---|---|---|
| 5,222,081 | 6/1993 | Lewis | 375/117 |
| 5,301,274 | 4/1994 | Li | 395/250 |
| 5,406,369 | 4/1995 | Killpatrick et al. | 365/350 |
| 5,654,983 | 8/1997 | Sauser, Jr. | 375/225 |
| 5,661,751 | 8/1997 | Johnson | 375/219 |
| 5,799,208 | 8/1998 | Hwang et al. | 395/858 |
| 5,920,825 | 7/1999 | Patel et al. | 455/557 |

*Primary Examiner*—Glenn A. Auve
*Assistant Examiner*—Tim Vo
*Attorney, Agent, or Firm*—Ladas & Parry

[57] ABSTRACT

A USB/UART converter connected between a DTE and a DCE is disclosed. The USB/UART converter comprises: a USB controller connected to a USB of the DTE, and a UART controller connected to the DCE and the USB controller. According to the present invention, the control signals for the DCE and the parameter settings for the UART controller are sent from the DTE through the USB controller in a control transfer mode. Then, the UART controller transfers the status signals through the USB controller to the DTE in an interrupt transfer mode after detecting the status signals coming from the DCE. Subsequently, the data can be transferred between the DTE and the DCE in an isochronous data transfer mode in response to the parameters.

7 Claims, 4 Drawing Sheets

USB/UART CONVERTER AND ITS CONTROL METHOD

BACKGROUND OF THE INVENTION

1. Field of the Invention

This invention relates to serial port technology. More particularly, it relates to a converting apparatus for transferring data between DCE and DTE through a universal serial bus (USB) and its control method.

2. Description of the Prior Art

Three drawbacks top any list of the most aggravating aspects of conventional RS-232C serial ports: low speed, complex cabling, and the limited number of ports. First introduced in 1996, the Universal Serial Bus (USB hereinafter), solves all three. It combines a signaling rate of 12 Mbits/sec with a mistake proof wiring system, allows the connection of up to 127 peripheral devices, has low cost and plug-and-play functions. In other words, it is much more than a successor to the RS-232C serial port. At present, several USB functions such as displays, keyboards, mice, joysticks, scanners, etc., have been successively realized by USB's vendors. However, since a common protocol has not been established in conventional communication equipment (such as instrument control interface, data acquisition equipment, modem, telephones, integrated service digital network terminal adapter (ISDN TA), etc.), the universal asynchronous receiver/transmitter (UART) currently prevails in asynchronous serial reception/transmission.

Referring to FIG. 1, a diagram illustrates the connection between a data terminal equipment (DTE) 1 and a data communications equipment (DCE) 2 of the prior art. Generally, the DTE 1 refers to a computer console, and the DCE 2 refers to an instrument control interface, data acquisition equipment, modem, telephones and integrated service digital network terminal adapter among others. In general, the DCE 1 as used here refers broadly to the equipment for asynchronous serial reception/transmission. In the drawing, an RS-232C cable 10 is coupled between the DTE 1 and the DCE 2, whose two ends 12 and 14 connected to the DTE 1 and the DCE 2, respectively, are all RS-232 connectors. The DTE 1 has an internal UART chip 16 (commonly known as 16450 or 16550) serving as an interface between the DTE 1 and DCE 2 for asynchronous serial reception/transmission.

Therefore, a converting device is required for transferring the asynchronous serial signals through a USB of the DTE 1 to and from the DTE 2, enabling the asynchronous serial reception/transmission equipment to work with the USB interface before or even after a communication protocol prevails.

SUMMARY OF THE INVENTION

Therefore, it is an object of the present invention to provide a USB/UART converter for transferring data between the DCE and the DTE through a USB, so asynchronous serial signals processed by the DCE can be transferred to/from the DTE.

It is another object of the present invention to provide a USB/UART converter for data transfer between the DCE and the DTE through the USB that is compatible with the USB interface without upgrading the DCE.

It is yet another object of the present invention to provide a USB/UART converter for data transfer between the DCE and the DTE through the USB, to be realized with state machines regardless of the requirements for microprocessors.

The above objects can be realized by providing a USB/UART converter and its control method. The USB/UART converter is connected between a DTE and a DCE, and comprises: a USB controller connected to a USB of the DTE, and a UART controller connected to the DCE and the USB controller. According to the present invention, the control signals for the DCE and the parameter settings for the UART controller are sent from the DTE through the USB controller in a control transfer mode. Then, the UART controller transfers the status signals through the USB controller to the DTE in an interrupt transfer mode after detecting the status signals coming from the DCE. Subsequently, the data can be transferred between the DTE and the DCE in an isochronous data transfer mode in response to the parmeters.

Accordingly, the DCE can transfer data with the DTE through a USB, and be compatible with the USB interface without upgrading. In addition, the USB/UART converter can be realized with state machines regardless of the requirements for microprocessors.

BRIEF DESCRIPTION OF THE DRAWINGS

The objects, features and advantages of this invention will be more clearly understood from the following description of a preferred embodiment taken in conjunction with the accompanying drawings in which.

DETAILED DESCRIPTION OF THE PREFERRED EMBODIMENTS

The USB/UART converter in accordance with the present invention can convert asynchronous serial data or status signals coming from the DCE 2 into signals that the USB can process. In addition, the USB/UART converter can convert the data or control signals for the DCE 2 forwarded by the DTE 1 into corresponding asynchronous serial signals. Therewith, the DTE 1 can transfer signals through the USB to and from the DCE 2. Moreover, the USB/UART converter of the present invention can be realized with state machines, regardless of the requirements for the microprocessors.

Figure 1:
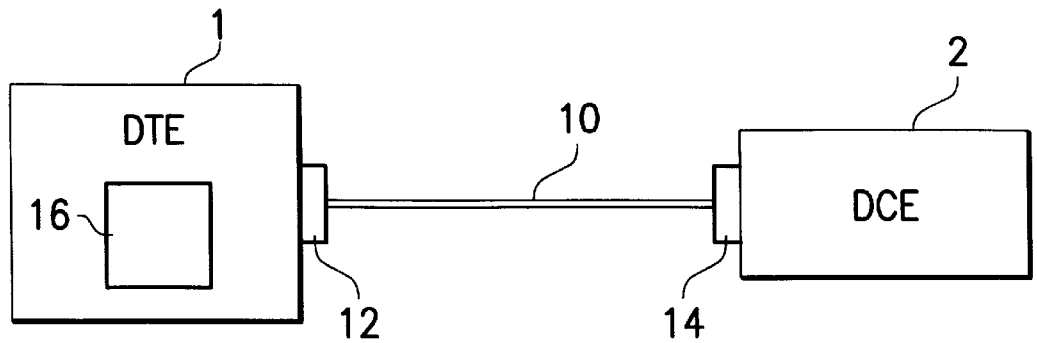
FIG. 1 is a diagram illustrating the connection between a DTE and a DCE of the prior art.
Figure 2:
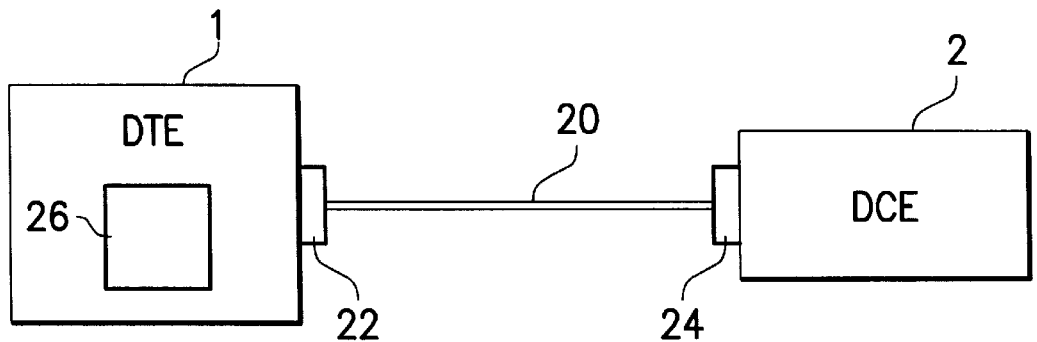
FIG. 2 is a diagram illustrating the connection between a DTE and a DCE in accordance with the present invention.

Referring to FIG. 2, a diagram illustrates the connection between a DTE and a DCE of the present invention. Generally speaking, the DTE 1 refers to a computer console, whereas the DCE 2 can be an instrument control interface, data acquisition equipment, modem, telephone, or ISDN TA among others. Briefly, the DCE 2 as used here refers to asynchronous serial reception/transmission equipment. A USB/UART converter 20 of the present invention is coupled between the DTE 1 and the DCE 2. The USB/UART converter 20 has one end 22 configured with a USB type-A connector connected to the DTE 1, and the other end 24 configured with an RS-232C connector connected to the DCE 2. Moreover, a bridge chip 26 is installed internally between the USB and the system bus in the DTE 1, such as a USB/PCI bridge chip of 82371SB (PIIX3) manufactured by Intel Corp.

Figure 3:
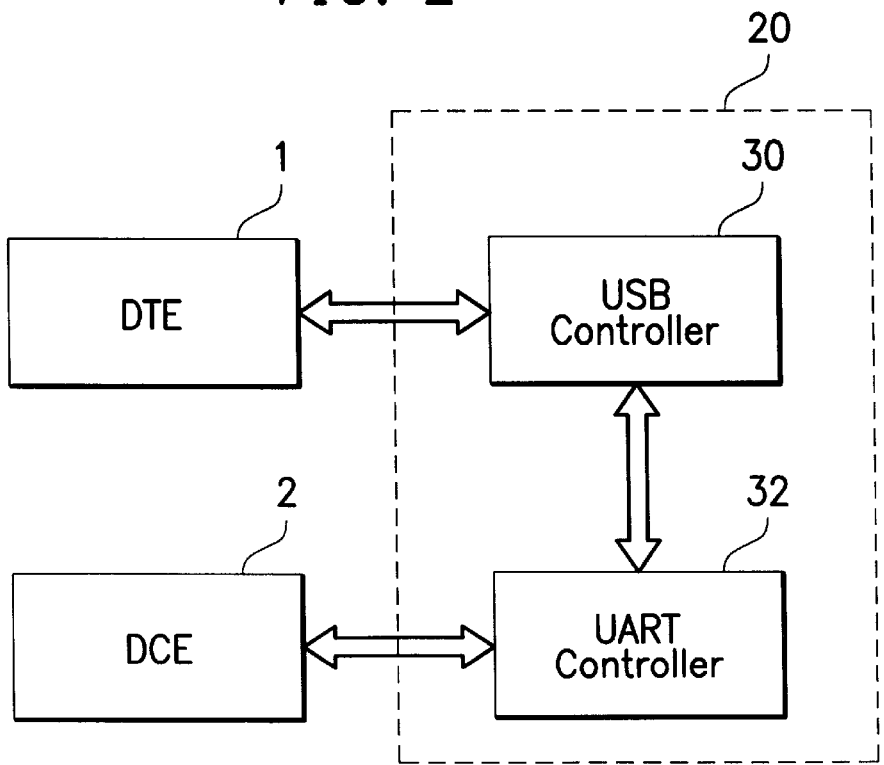
FIG. 3 is a block diagram illustrating the USB/UART converter in accordance with the present invention.

Referring to FIG. 3, a block diagram illustrates the USB/UART converter 20 of the present invention. The USB/UART converter 20 of the present invention comprises a USB controller 30 and an UART controller 32. Therein, the USB controller 30 is connected to the DTE 1, whereas the UART controller 32 is connected to the DCE 2. There is an EIA driver (not shown in the drawing) between the UART controller 32 and the DCE 2 for voltage level conversion. The USB controller 30 and the UART controller 32 are coupled to each other and serve as a converting interface between the USB signals and the asynchronous serial signals. According to the present invention, both the USB controller 30 and the UART controller 32 are realized with state machines.

According to the present invention, the DTE 1 first has to set and control the parameters required for asynchronous serial reception/transmission before performing data transfer. Therefore, after the USB enumeration, various parameters, such as baud rate, data bits, stop bits, parity bit and so forth, are made by application programs at the DTE 1 through the USB client driver firmware, and sent to the USB controller 30 in a USB control transfer mode for further setting the UART controller 32. Afterwards, control signals RTS (Request To Send) and DTR Data Terminal Ready), after being delivered by the DTE 1 to the USB controller 30 in the USB control transfer mode, is further delivered to the DCE 2 via the UART controller 32.

According to the present invention, the UART controller 32 is responsible for detecting status signals such as RI (Ring Indicator), DSR (Data Set Ready), CTS (Clear To Send), DCD (Data Carrier Detect), PE (Parity Error) and STE (Stop-bit Error) coming from the DCE 2. In a USB interrupt transfer mode, the detected status signals are sent to the USB controller 30. Since USB adopts differential signals, the signals are converted by the USB controller 30 and then supplied to the DTE 1. After asynchronous serial reception/transmission functions are all set ready, data can be transferred between the DTE 1 and the DCE 2 in a USB iso-chronous data transfer mode in response to the parameters of the baud rate, data bits, stop bits, parity bit, and so on.

Figure 4:
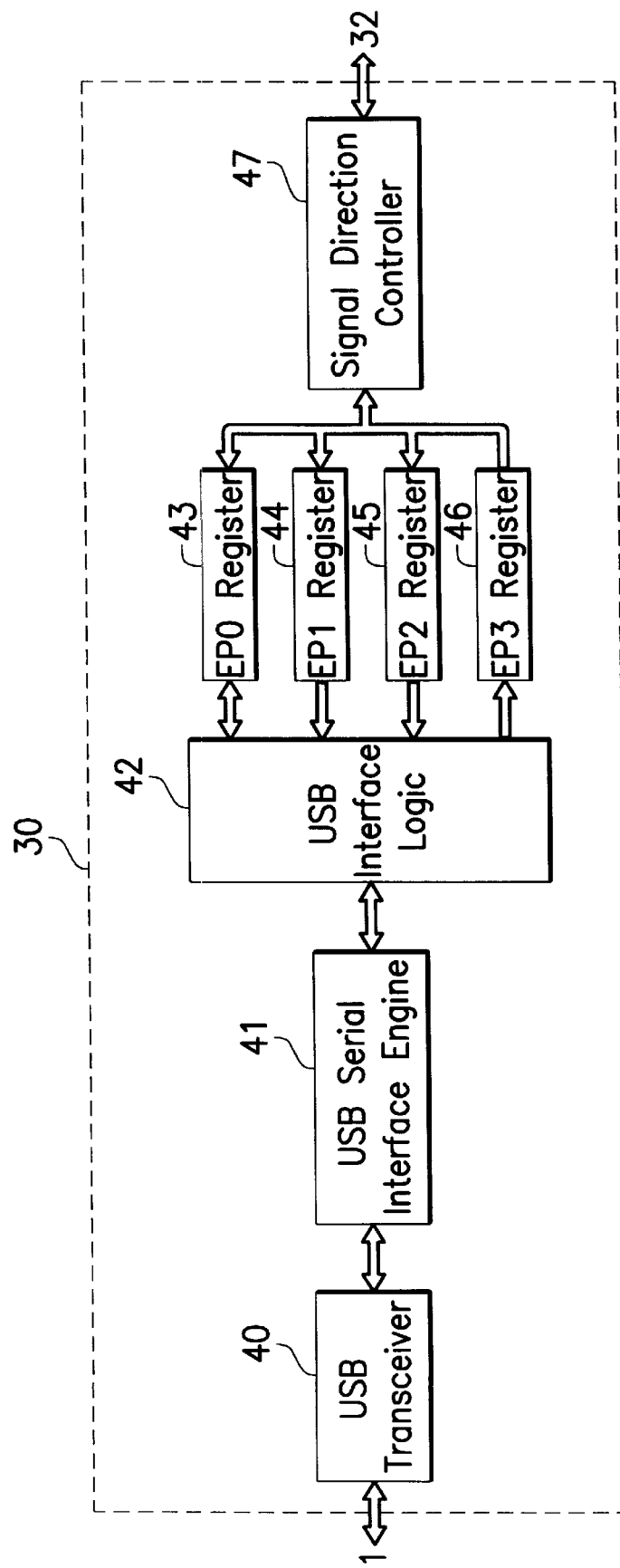
FIG. 4 is a block diagram illustrating one preferred embodiment of the USB controller 30.

Referring to FIG. 4, a block diagram illustrates one preferred embodiment of the USB controller 30. As shown in the drawing, the USB controller 30 comprises: a USB transceiver 40, a USB serial interface engine 41, a USB interface logic 42, an endpoint-0 FIFO (thereafter, EP0) register 43, an endpoint-1 FIFO (thereafter, EP1) register 44, an endpoint-2 FIFO (thereafter, EP2) register 45, an endpoint-3 FIFO (thereafter, EP3) register 46, and a signal direction controller 47.

The control signals RTS (Request To Send) and DTR (Data Terminal Ready), and various parameters, such as baud rate, data bits, stop bits, and parity bit, are written from the DTE 1 into the EPO register 43 in the USB control transfer mode, while the status signals such as RI (Ring Indicator), DSR (Data Set Ready), CTS (Clear to Send), DCD (Data Carrier Detect), PE (Parity Error) and STE (Stop-bit Error) detected by the UART controller 32 are written into the EP1 register 44 from the DCE 2 in the USB interrupt transfer mode. When the USB isochronous data transfer is operating, the data sent from the DCE 2 to the DTE 1 are transferred via the EP2 register 45, therefore, the EP2 register 45 is also called the "isochronous input register." Conversely, the data sent from the DTE 1 to the DCE 2 are transferred via the EP3 register 46, therefore, the EP3 register 46 is also called the "isochronous output register."

Moreover, the USB control transfer mode comprises a first control write message and a second control write message. Tables 1 and 2 represent the formats of the first control write message and the second control write message written to EP0 register 43, respectively.

TABLE 1

| BIT 7 | BIT 6 | BIT 5 | BIT 4 | BIT 3 | BIT 2 | BIT 1 | BIT 0 |
|-------|-------|-------|-------|-------|-------|-------|-------|
| —     | —     | —     | BRG0  | BRG1  | BRG2  | DTR   | RTS   |

Wherein, when BRG0/1/2 is set to 000, the baud rate is 2,400 bps; when BRG0/1/2 is set to 001, the baud rate is 4,800 bps; when BRG0/1/2 is set to 010, the baud rate is 9,600 bps; when BRG0/1/2 is set to 011, the baud rate is 19,200 bps; when BRG0/1/2 is set to 100, the baud rate is 38,400 bps; when BRG0/1/2 is set to 101, the baud rate is 57,600 bps; when BRG0/1/2 is set to 110, the baud rate is 115,200 bps; when BRG0/1/2 is set to 111, the baud rate is 230,400 bps.

TABLE 2

| BIT 7 | BIT 6 | BIT 5 | BIT 4 | BIT 3 | BIT 2 | BIT 1 | BIT 0 |
|-------|-------|-------|-------|-------|-------|-------|-------|
| SBG0  | SBG1  | PG0   | PG1   | BCG0  | BCG1  | —     | —     |

Wherein, one stop bit is generated when SBG0/1 is set to 00; 1 and ½ stop bits are generated when SBG0/1 is set to 01; 2 stop bits are generated when SBG0/1 is set to 10. When PG0/1 is set to 00, it is in even parity; when PG0/1 is set to 01, it is in odd parity; when PG0/1 is set to 10, there is no parity bit. And 5 bit characters are generated when BCG0/1 is set to 00; 6 bit characters are generated when BCG0/1 is set 01; 7 bit characters are generated when BCG0/1 is set 10; and 8 bit characters are generated when BCG0/1 is set 11.

The following Table 3 represents a format written to the EP1 register 44 in the USB interrupt transfer mode:

TABLE 3

| BIT 7 | BIT 6 | BIT 5 | BIT 4 | BIT 3 | BIT 2 | BIT 1 | BIT 0 |
|-------|-------|-------|-------|-------|-------|-------|-------|
| —     | —     | STE   | PE    | DCD   | CTS   | DSR   | RI    |

Since those signals transferred between the USB controller 30 and the DTE 1 belong to differential signals, the USB transceiver 40, the USB serial interface engine 41 and the USB interface logic 42 serve as the converting interface for each of the registers 43–46 and the DTE 1. The function of the USB serial interface engine 41 is primarily to transfer signals to and from the USB transceivers 40, while the function of the USB interface logic 42 is to categorize the signals to be transferred to the registers 43 and 46, or to identify the signals from the registers 44 and 45.

Figure 5:
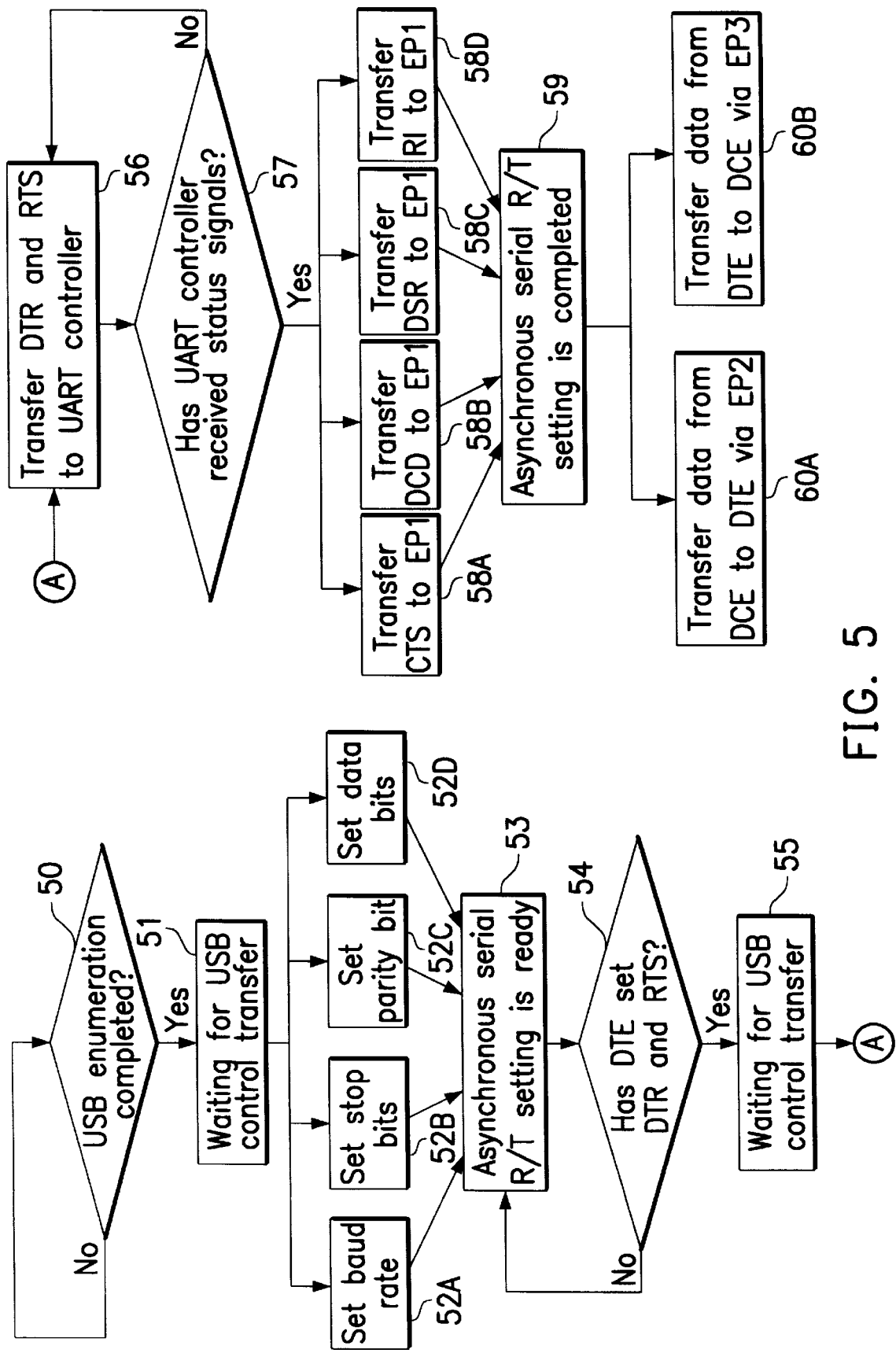
FIG. 5 is a flowchart illustrating the control of signal direction controller 47 realized with state machines.

The signal direction controller 47 is responsible for controlling the operation of the USB controller 30. The signal direction controller 47 in accordance with the present invention is realized with state machines. Refer to FIG. 5, a flowchart illustrating the control process of signal direction controller 47 realized with state machines. In the drawing, each step of the flcowchart can be implemented by a state machine. First, in Step 50, the USB enumeration is confirmed to be completed or not; if yes, then proceed to Step 51 and wait for the USB control transfer mode to enter the asynchronous serial reception/transmission settings. Further, in Steps 52A–52D, the DTE 1 writes by means of the application program in the USB control transfer mode the various required asynchronous serial reception/transmission parameters, such as baud rate, stop bits, parity bit and data bits, into the EP0 register 43. In addition, the signal direction controller 47 sets those asynchronous serial reception/transmission parameters to the UART controller 32. Accordingly, the UART controller 32 performs various parameter settings (to be described later) and in Step 53 enters into an asynchronous serial reception/transmission setting ready status.

Next, the asynchronous serial reception/transmission control procedure is performed. In Step 54, it is determined whether the DTE 1 has sent the control signals DTR and RTS; if not, then return to Step 53; if yes, proceed to Step 55, wait for the USB control transfer mode and write the control signals DTR and RTS into the EP0 register 43. Further in Step 56, the signal direction controller 47 supplies the control signals DTR and RTS to the UART controller 32. Since the UART controller 32 will supply the control signals DTR and RTS to the DCE 2 (to be described later), in Step 57, the status signals RI, DSR, CTS and DCD will be detected by the UART controller 32. If status signals are not yet received, then return to Step 56; if yes, the signal direction controller 47 receives those status signals through the UART controller 32 in Steps 58A–58D and supplies the status signals CTS, DCD, DSR and RI to the EP1 register 44, and further supplies those status signals to the DTE 1 in the USB interrupt transfer mode. Therefore, the asynchronous serial reception/transmission setting is completed in Step 59.

Next, the signal director controller 47 can transfer data between the asynchronous DTE 1 and the DCE 2 in accordance with the settings of the baud rate, data bits, stop bits, parity bit through the EP2 and the EP3 registers in the USB isochronous transfer mode. As shown in FIG. 5, in Step 60A, asynchronous serial data received from the DCE 2 are sent to the DTE 1 through the EP2 register 45; or in Step 60B, data received from the DTE 1 are sent to the DCE 2 through the EP3 register 46.

To illustrate, the EP0 register 43 for control transfer can be of 16 bytes, while the EP1 register 44 for interrupt transfer can be of 8 bytes, whereas the EP2 register 45 and the EP3 register 46 for isochronous data transfer can be of 48 bytes.

Figure 6:
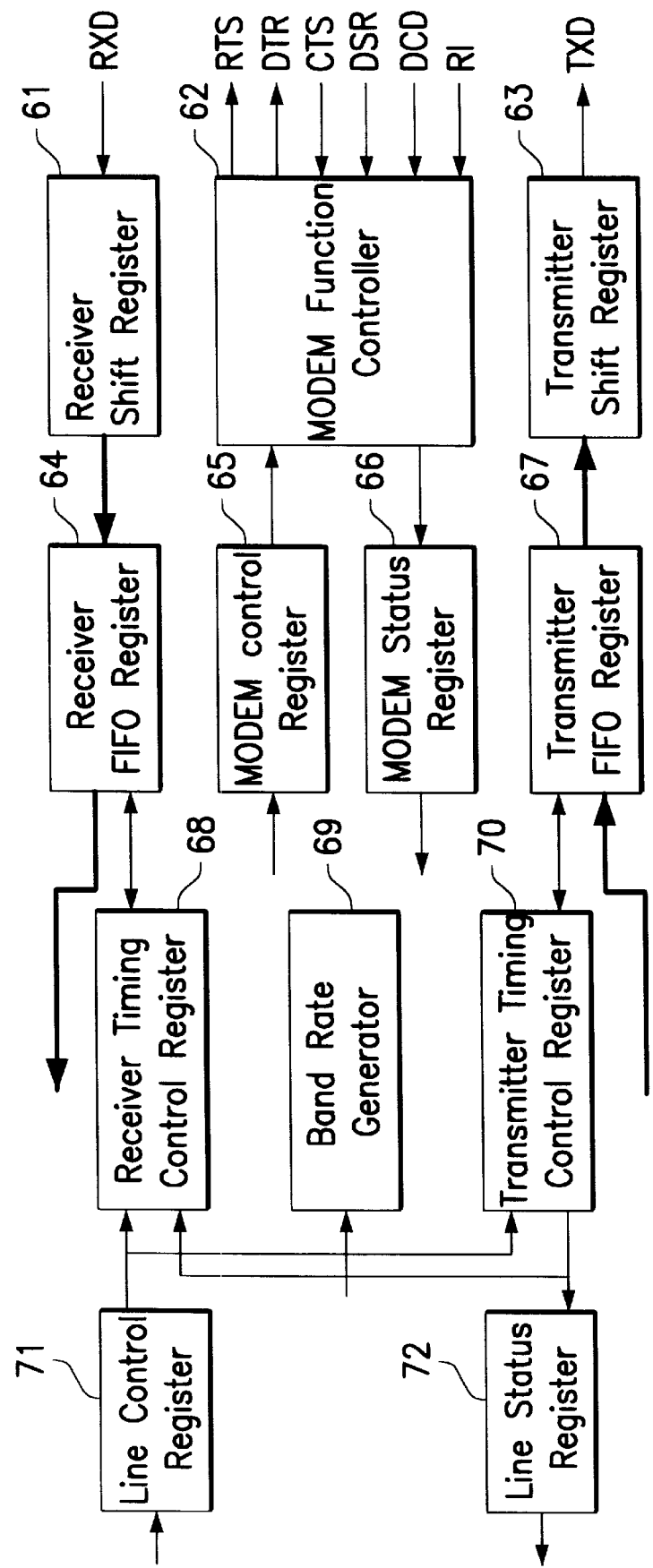
FIG. 6 is a block diagram illustrating one preferred embodiment of the UART controller 32.

Referring to FIG. 6, a block diagram illustrates one preferred embodiment of the UART controller 32 of FIG. 3. As shown in the drawing, the UART controller 32 comprises: a receiver shift register 61, a MODEM function controller 62, a transmitter shift register 63, a receiver FIFO register 64, a MODEM control register 65, a MODEM status register 66, a transmitter FIFO register 67, a receiver timing control register 68, a baud rate generator 69, a transmitter timing control register 70, a line control register 71, and a line status register 72.

The UART controller 32 transfers the serial data RXD from the DCE 2 to the receiver FIFO register 64 through the receiver shift register 61, supplying to the signal direction controller 47 after converting the data into a parallel data format and transfers through the EP2 register 45 to the DTE 1. However, the data coming from the EP3 register 46 through the signal direction controller 47 are transferred to the transmitter FIFO register 67 and supplied to the DCE 2 after the data are received and converted into the asynchronous serial data TXD by the transmitter shift register 63.

The line control register 71 and the baud rate generator 69 are in charge of controlling the asynchronous serial reception/transmission parameter settings. Therefore, the line control register 71 and the baud rate generator 69 receive from DTE 1 through the USB controller 30 and set parameters for baud rate, stop bits, parity bit and data bits so as to adjust the receiver timing control register 68 and the transmitter timing control register 70. Accordingly, the data can be transferred in a format responsive to current settings of baud rate, stop bits, parity bit and data bits.

The control of the DCE 2 is made through the MODEM control register 65 by sending the control signals RTS and DTR set by the DTE 1 to the MODEM function controller 62 while the USB controller 30 is in the USB control transfer mode. The transfer status as to the DCE 2 is received from the status signals DCD, CTS, DSR, and RI from the MODEM function controller 62 through the MODEM status register 66, and is sent to the DTE 1 while the USB controller 30 is in the USB interrupt transfer mode.

If any errors, such as "overwrite," "parity error (PE)," and "stop bit error (STE)" in the receiver FIFO register 64 and transmitter FIFO register 67, occur during the data transfer, the errors will be responded to through the line state register 72 by the signal direction controller 47 to force the receiver FIFO register 64 and transmitter FIFO register 67 to discard the overwritten data or to inform the DTE 1 of the PE or STE status signals while the USB controller 30 is in the USB interrupt transfer mode.

To summarize, the USB/UART converter for data transfer between the DCE and the DTE through the USB and its control method of the present invention enables asynchronous serial signals to be transmitted between the DCE and DTE through the USB. Moreover, compatibility with the USB is provided without the need of updating the DTE. Furthermore, the USB/UART converter of the invention is realized with state machines, hence, no requirements for the microprocessors are necessary.

Although the present invention has been described in its preferred embodiment, it is not intended to limit the invention to the precise embodiment disclosed herein. Those who are skilled in this technology can still make various alterations and modifications without departing from the scope and spirit of the present invention. Therefore, the scope of the present invention shall be defined and protected by the following claims and their equivalents.

What is claimed is:

1. A USB/UART converter connected between a DTE and a DCE, said USB/UART converter comprising:

a USB controller connected to a USB of said DTE, comprising a first register into which control signals and parameters are written: a second register into which status signals are written; a third register into which data supplied from said DCE to said DTE are written; a fourth register into which data supplied from said DTE to said DCE are written; a signal direction controller connected with said registers for regulating said control signals, parameters, status signals and data; and a UART controller connected between said DCE and said USB controller;

wherein said control signals for said DCE and said parameters for said UART controller are transferred from said DTE through said USB controller in a control transfer mode; the UART controller transfers status signals through said USB controller to said DTE in an interrupt transfer mode after detecting said status signals from said DCE; and data can be transferred between said DTE and said DCE in an isochronous data transfer mode in response to said parameters.

2. The USB/UART converter as claimed in claim 1, wherein the end connected to said DTE is a USB connector, and the other end connected to said DCE is a RS-232C connector.

3. The USB/UART converter as claimed in claim 1, wherein said signal direction controller is implemented by state machines.

4. The USB/UART converter as claimed in claim 1, wherein said USB controller further comprises: a USB transceiver; a USB serial interface engine; and a USB interface logic serving as a converting interface between said registers and said DTE.

5. A method of controlling a USB/UART converter, connected between a DTE and a DCE and including a USB controller having a first register, a second register, a third register, and a fourth register; and a UART controller, said control method comprising the steps of:

(a) supplying control signals for said DCE and parameters for said UART controller from said DTE through said USB controller in a control transfer mode;

(b) supplying status signals through said USB controller to said DTE in an interrupt transfer mode after said UART controller detects said status signals from said DCE;

(c) transferring data between said DTE and said DCE in an isochronous data transfer mode responsive to said parameters; and (e) writing said control signals and said parameters into said first register, writing said status signals into said second register, writing said data supplied from said DCE to said DTE into said third register, and writing said data supplied from said DTE to said DCE into said fourth register.

6. The control method as claimed in claim 5 further comprising a USB enumeration step prior to step (a).

7. The control method as claimed in claim 5, wherein, in step (a) the step of setting parameters for said UART controller is performed prior to the step of transferring said control signals to said DCE.

* * * * *